(12) United States Patent
Ki

(10) Patent No.: US 12,242,387 B2
(45) Date of Patent: Mar. 4, 2025

(54) SYSTEMS AND METHODS FOR MANAGING MEMORY UTILIZATION

(71) Applicant: Samsung Electronics Co., Ltd., Suwon-si (KR)

(72) Inventor: Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/726,100

(22) Filed: Apr. 21, 2022

(65) Prior Publication Data
US 2023/0289297 A1    Sep. 14, 2023

Related U.S. Application Data

(60) Provisional application No. 63/319,604, filed on Mar. 14, 2022.

(51) Int. Cl.
    *G06F 12/1045*     (2016.01)

(52) U.S. Cl.
    CPC .. *G06F 12/1054* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 5,948,082 A | | 9/1999 | Ichikawa |
| 6,124,868 A | * | 9/2000 | Asaro ............... G06F 9/3879 345/565 |
| 6,363,470 B1 | * | 3/2002 | Laurenti ............ G06F 9/3891 712/E9.019 |
| 7,761,666 B2 | | 7/2010 | Narad et al. |
| 8,751,737 B2 | | 6/2014 | Bu et al. |
| 8,838,882 B1 | * | 9/2014 | Quong ............... G06F 12/0802 711/167 |
| 9,384,147 B1 | | 7/2016 | Morshed et al. |

(Continued)

FOREIGN PATENT DOCUMENTS

| | | |
|---|---|---|
| CN | 111290709 A | 6/2020 |
| CN | 109799959 B | 7/2020 |

OTHER PUBLICATIONS

Lee, Patrick P.C., et al., "A Lock-Free, Cache-Efficient Multi-Core Synchronization Mechanism for Line-Rate Network Traffic Monitoring," 2010, IEEE International Symposium on Parallel & Distributed Processing (IPDPS), 12 pages.

(Continued)

*Primary Examiner* — Yaima Rigol
(74) *Attorney, Agent, or Firm* — Lewis Roca Rothgerber Christie LLP

(57) ABSTRACT

Systems and methods for managing memory are disclosed. In one embodiment, a first data structure is generated, where the first data structure is associated with one or more virtual addresses mapped to one or more physical addresses of the memory. A size of the first data structure is based on a characteristic of the memory. Data to be stored in the memory is received, and a virtual address of the one or more virtual addresses is identified based on the first data structure. The virtual address is mapped to a physical address, and the data is stored in the physical address. The first data structure is updated based on the storing of the data.

15 Claims, 7 Drawing Sheets

(56) References Cited

U.S. PATENT DOCUMENTS

| | | |
|---|---|---|
| 9,672,180 B1 | 6/2017 | Morshed et al. |
| 10,101,964 B2 | 10/2018 | Xiong et al. |
| 10,191,849 B2 | 1/2019 | Delgado et al. |
| 10,216,640 B2 | 2/2019 | Rushing et al. |
| 10,248,563 B2 | 4/2019 | Tosaka |
| 10,275,378 B2 | 4/2019 | Benisty |
| 10,311,542 B2 | 6/2019 | Cook et al. |
| 10,430,352 B1 | 10/2019 | Sanghi et al. |
| 10,649,686 B2 | 5/2020 | Tsirkin |
| 10,977,192 B1 | 4/2021 | Habusha et al. |
| 11,080,189 B2 | 8/2021 | Wang et al. |
| 2003/0058875 A1 | 3/2003 | Arndt et al. |
| 2006/0236011 A1 | 10/2006 | Narad et al. |
| 2007/0260782 A1* | 11/2007 | Shaikli .............. H04L 47/50 710/52 |
| 2011/0016284 A1* | 1/2011 | Balan ............ H04L 49/9015 711/170 |
| 2017/0091096 A1* | 3/2017 | McCarthy ........... G06F 12/128 |
| 2017/0123667 A1* | 5/2017 | Richter ............... G06F 3/061 |
| 2017/0168948 A1* | 6/2017 | Delgado ........... G06F 12/0864 |
| 2017/0206169 A1 | 7/2017 | Coppola et al. |
| 2018/0196602 A1* | 7/2018 | Shin ................. G06F 3/0659 |
| 2020/0285585 A1* | 9/2020 | Oikawa ............ G06F 12/0895 |
| 2020/0301765 A1* | 9/2020 | Vary .................. G06F 9/52 |
| 2020/0387405 A1* | 12/2020 | Xiao ................. G06F 12/109 |
| 2021/0019261 A1* | 1/2021 | Tsirkin ............. G06F 9/45545 |
| 2021/0064280 A1* | 3/2021 | Gunda ............... G11B 27/005 |
| 2021/0216240 A1 | 7/2021 | Matsunaga |
| 2021/0405897 A1* | 12/2021 | Hansalia ............ G06F 3/0632 |
| 2022/0137817 A1* | 5/2022 | Kwak ............... G06F 3/061 711/154 |

OTHER PUBLICATIONS

EPO Extended European Search Report dated Jul. 21, 2023, issued in European Patent Application No. 23161029.6 (12 pages).

* cited by examiner

SYSTEMS AND METHODS FOR MANAGING MEMORY UTILIZATION

CROSS-REFERENCE TO RELATED APPLICATION(S)

The present application claims priority to and the benefit of U.S. Provisional Application No. 63/319,604, filed Mar. 14, 2022, entitled "CACHE-AWARE RING BUFFER MANAGEMENT USING EVENTUAL CONSISTENCY," the entire content of which is incorporated herein by reference.

FIELD

One or more aspects of embodiments according to the present disclosure relate to managing memory, and more particularly to managing utilization of cache memory.

BACKGROUND

It may be desirable to use a computational storage device for various data processing tasks, as such a storage device may help provide efficient and cost-effective data processing solutions. The computational storage device may perform computations locally and send results of the computations to a host device.

The above information disclosed in this Background section is only for enhancement of understanding of the background of the present disclosure, and therefore, it may contain information that does not form prior art.

SUMMARY

An embodiment of the present disclosure is directed to a method for managing memory. The method comprises generating a first data structure associated with one or more virtual addresses mapped to one or more physical addresses of the memory. A size of the first data structure is based on a characteristic of the memory. Data to be stored in the memory is received, and a virtual address of the one or more virtual addresses is identified based on the first data structure. The virtual address is mapped to a physical address, and the data is stored in the physical address. The first data structure is updated based on the storing of the data.

In one embodiment, the first data structure includes a circular buffer.

In one embodiment, the memory includes a set associative cache memory.

In one embodiment, the first data structure is configured to track production and consumption of data in and out of the memory based on an eventual consistency model.

In one embodiment, the size of the data structure is based on at least one of a size of the memory, a placement policy used by the memory, or a number of processors having access to the memory.

In one embodiment, the method further includes monitoring a utilization of the first data structure; and adjusting the size of the first data structure based on the utilization. The size may be a cache line size.

In one embodiment, the method further includes generating, by a storage device, a second data structure, wherein the second data structure is based on the first data structure; updating, by the storage device, the second data structure in response to producing the data; and transmitting a message to the host computing device in response to the updating of the second data structure for updating the first data structure, wherein the first data structure and the second data structure adhere to an eventual consistency model.

In one embodiment, the method further includes identifying the virtual memory address of the first data structure storing the data; mapping the virtual address to the physical address of the memory; retrieving the data from the physical address of the memory; and updating the first data structure based on the retrieving of the data.

In one embodiment, the method further includes generating, by the storage device, a second data structure, wherein the second data structure is based on the first data structure; receiving, by the storage device, a message from a host computing device in response to the updating of the first data structure; updating, by the storage device, the second data structure in response to the message from the host computing device, wherein the first data structure and the second data structure adhere to an eventual consistency model.

Embodiments of the present disclosure are also directed to a host computing device comprising a memory, and a processor coupled to the memory. The processor includes logic for: generating a first data structure associated with one or more virtual addresses mapped to one or more physical addresses of the memory, wherein a size of the first data structure is based on a characteristic of the memory; receiving data to be stored in the memory; identifying a first virtual address of the one or more virtual addresses based on the first data structure; mapping the first virtual address to a first physical address; storing the data in the first physical address; and updating the first data structure based on the storing of the data.

Embodiments of the present disclosure are further directed to a storage device coupled to a host computing device having a memory. The storage device comprises a storage medium, and a processor coupled to the storage medium. The processor includes logic for producing data; identifying a virtual address of one or more virtual addresses of a data structure, wherein the virtual address is mapped to a physical address of the memory of the host computing device, wherein a size of the data structure is based on a characteristic of the memory; storing the data in the physical address; and updating the data structure based on the storing of the data.

As a person of skill in the art should recognize, the use of the circular buffer to manage cache behavior helps improve data transfer performance between the device and the host.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
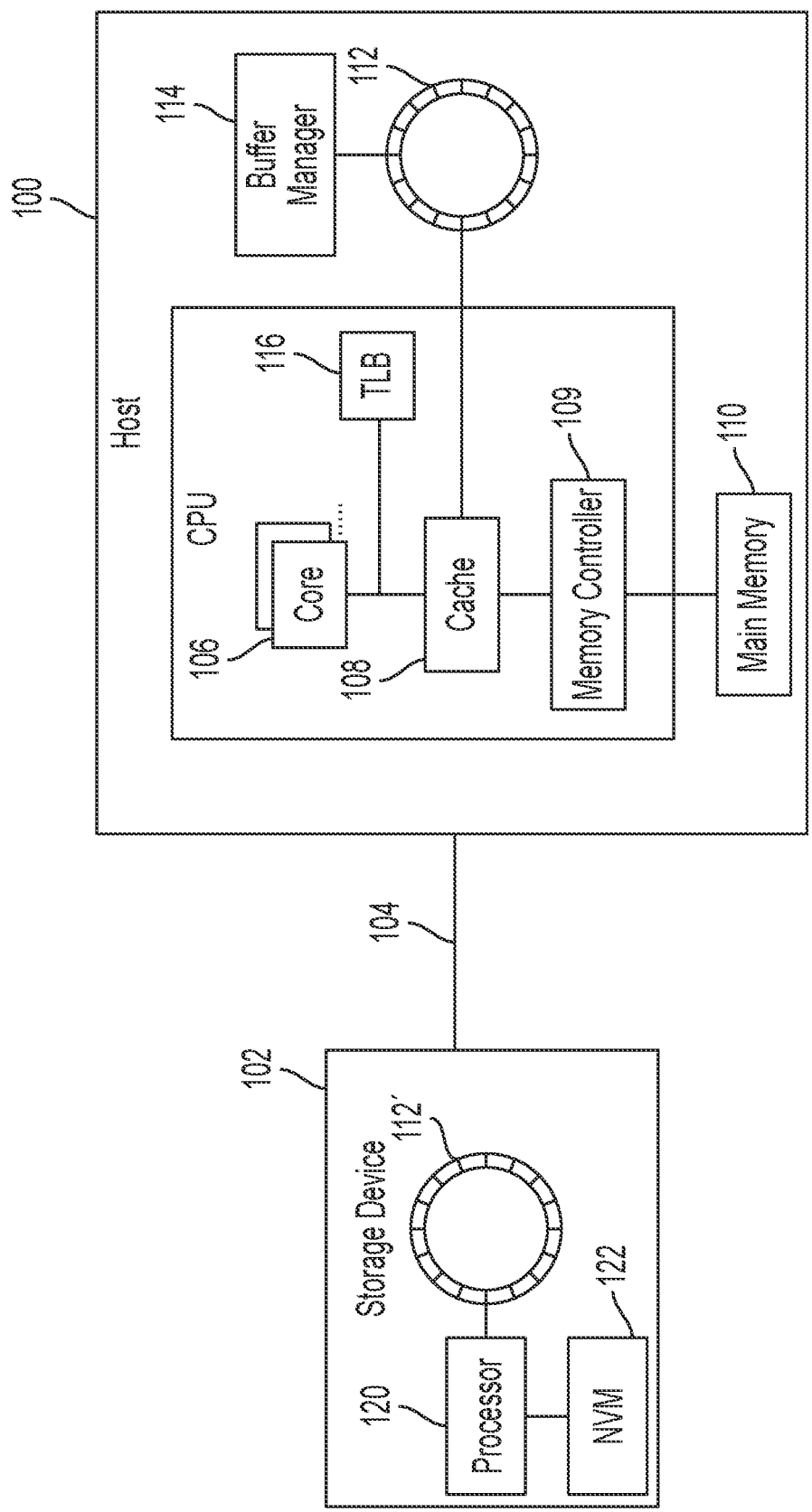
FIG. 1 shows a block diagram of a computer system configured for memory utilization management according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A computational storage device (for example, a solid state drive (SSD) with an embedded processor or Field Programmable Gate Array (FPGA)), may perform computations locally and send results of the computations to a host device. Computations performed by the storage device may include, for example, Sparse Length Sum (SLS) operations of a Deep Learning Recommendation Model (DLRM) using multiple vectors. Other computations may include identifying records in a table stored in the storage device, performing aggregation operations using the records, and transmitting results of the aggregation operations to the host.

The host may receive the computation results through a device driver, which may in turn pass the results to an application running on the host. Typically, in order for the application to utilize the results, the results are placed in cache memory. Direct cache access mechanisms that allow direct access to the cache memory may be used to store computation results output by the storage device, directly in cache memory instead of a main memory such as a dynamic random access memory (DRAM). For example, CDMA may allow data to be stored directly into a level 2 (L2) cache, while DDIO may allow data to be stored directly in a last level cache (LLC). Storing data directly in the cache memory may help reduce data access latency that is typical with DRAM accesses, and may help increase throughput for the storage device.

A drawback of using a direct cache access mechanism to store data directly into the cache memory is the lack of control of use of the cache memory to store data. Such control may be desirable, for example, as cache memory space is limited, and there may be other processing cores competing for the same memory space. If the cache memory is filled with data used by one of the cores, the remaining cores may be forced to access the DRAM, negatively affecting performance of the cores.

In general terms, the various embodiments of the present disclosure are directed to systems and methods for managing utilization of the cache memory via a circular or ring data structure referred to as a ring buffer. The ring buffer is a circular in structure because when a pointer accesses a last virtual address of the buffer, the pointer wraps back to the beginning of the buffer to access a first virtual address.

The ring buffer may control and limit the use of cache memory space. In this regard, each entry in the ring buffer may identify a virtual address of a page in a virtual address space. The virtual address is translated into a physical address that identifies a cache line of the cache memory that is used to store data associated with the virtual address. The larger the ring buffer, the bigger the amount of cache memory used.

In one embodiment, a buffer manager is aware of the cache memory structure, including cache memory size, placement policy used by the cache memory, number of processors that use the cache memory, and/or the like. The buffer manager may use this knowledge to set the buffer size. In one embodiment, the buffer manager monitors a number of items in the buffer, and periodically adjusts the buffer size accordingly, optimizing use of the cache memory.

In one embodiment, the ring buffer follows a producer-consumer model where the storage device is the producer and the host is the consumer. In this regard, the storage device/producer generates data after local computation, and the host/consumer consumes the data generated by the storage device. A tail pointer of the ring buffer determines a location/entry/address of the ring buffer where the data is to be written into/produced. A head pointer of the ring buffer determines a location of the ring buffer where the data is to be retrieved/consumed. The tail pointer advances as new data is produced by the storage device, and points to a next available location in the buffer for writing data. The head pointer advances as the stored data is consumed by the host, and points to next data in the buffer to be consumed. The producing and consuming of data may be in response to requests from an application in the host.

Updates to the head and tail pointers may or may not be immediately available to the host and storage devices depending on whether cache coherency is supported. In an embodiment where the ring buffer resides in a shared memory space of the host and the storage device, cache coherency may be supported. In this case, both the storage device and the host device have access to the same ring buffer in the shared memory space. Updates to the tail and head pointers, as data is input and removed from the ring buffer, may be available to both the host and the storage device at substantially the same time.

In an embodiment where the ring buffer in the host is not shared with the storage device, cache coherency may not be supported. In case, the storage device maintains a copy of the host ring buffer in its own memory space. As the host consumes data from the host ring buffer and updates the head pointer, a message is sent to the storage device to update the copy of the head pointer in the shadow ring buffer. Similarly, as the storage device produces data for the shadow ring buffer and updates the tail pointer, a message is sent to the host to update the copy of the tail pointer of the host ring buffer.

In one embodiment, regardless of whether a cache coherent or cache non-coherent protocol is used, the ring buffer(s) adhere to an eventual consistency model. In this regard, although the update to the head pointer may not be immediately available to the storage device, or the update to the tail pointer may not be immediately available to the host, the updates eventually become available. Until then, the host relies on a prior value of the head pointer to decide whether there are any entries in the buffer to consume, and the storage device relies on a prior value of the tail pointer to decide whether there is room in the buffer to produce more data. Relying on prior pointer values may help avoid buffer overruns.

FIG. 1 is a block diagram of a computer system configured for memory utilization management according to one embodiment. The system may include a host computing device ("host") 100 coupled to a computational storage device ("storage device") 102 over a wired or wireless storage interface 104 including Ethernet, fiber channel, and/or other storage interface. The host 100 may transfer and receive data to and from the storage device 102 over the storage interface 104, using a storage interface protocol. The storage interface protocol may be, for example, a non-volatile memory express (NVMe) protocol or any other like protocol.

The storage device 102 may be a solid state drive (SSD) with an embedded processor 120 such as a field programmable gate array (FPGA), an SSD controller, and/or a discrete co-processor. In some embodiments, the embedded processor may be a graphics processing unit (GPU), tensor processing unit (TPU), and/or another application-specific integrated circuit ASIC. The embedded processor may be configured to perform various types of computations such as, for example, a Sparse Length Sum (SLS) operation of a Deep Learning Recommendation Model (DLRM) using multiple vectors. Other computations may include identifying records in a table stored in the storage device 102, performing aggregation operations using the records, and transmitting results of the aggregation operations to the host 100.

The storage device 102 may further include a non-volatile memory (NVM) media 122 for storing data provided by the host 100. The NVM media 122 may include one or more types of non-volatile memory such as, for example, flash memory.

In one embodiment, the host 100 includes one or more central processing unit (CPU) cores 106 (also simply referred to as "processors") configured to execute computer program instructions and process data stored in a cache memory 108 (also simply referred to as "memory" or "cache"). The cache memory 108 may be dedicated to one of the CPU cores 106, or shared by various ones of the CPU cores.

The cache memory 108 may include, for example, a level one cache (L1) coupled to level two cache (L2) coupled to a last level cache (LLC). The LLC cache may in turn be coupled to a memory controller 109 which in turn is coupled to a main memory 110. The main memory 110 may include, for example, a dynamic random access memory (DRAM) storing computer program instructions and/or data (collectively referenced as data) generated by the storage device 102. In order for an application of the host 100 to use data generated by the storage device 102, the data may be loaded into the cache memory 108, and the application may consume the data directly from the cache memory. If the data to be consumed is not already in the cache, the application may need to query other memory devices in the memory hierarchy to find the data. For example, if the data that is sought is not in the L1 cache, the application may query the L2 cache, and if not in the L2 cache, query the LLC cache, and if not in the LLC cache, query the DRAM.

In one embodiment, the data produced by the storage device 102 is stored directly in the cache memory 108 (e.g. L2 cache or LLC cache), bypassing the main memory 110. A direct cache access mechanism such as DDIO or CDMA may be used to write data directly into the cache. Use of a direct cache access mechanism may help avoid data access latency that is typical with DRAM accesses.

Because the cache memory 108 is a valuable resource, it may be desirable to manage use of the cache to avoid the storage device 102 from monopolizing the cache or polluting the cache with too much data. In one embodiment, a circular/ring data structure (hereinafter referred to as a ring buffer) 112a stored in buffer memory is used to manage and/or limit use of the cache space. In one embodiment, a buffer management system 114 generates the ring buffer 112a with a default size. The buffer management system 114 may create a separate ring buffer 112a per storage device 102, per CPU core 106, and/or the like.

In one embodiment, the ring buffer 112a comprises an array of contiguous virtual memory addresses of a given size. The virtual memory addresses may be translated to a physical memory address of the cache via a translation lookaside buffer (TLB) 116. In one example, if an address of a page in the virtual address space is accessed by an application in the host 100, the virtual address is translated into a physical address, and a cache line of the cache memory 108 that contains that address is allocated in the cache memory with a memory identifier (also referred to as a tag).

In one embodiment, the size of the ring buffer 112a is set so as to optimize use of the cache memory 108. In this regard, the size of the ring buffer is set based on the structure of the cache memory 108, including the cache size, associativity/placement policy of the cache, number of ring buffers available for the cache, cache line size, and/or the like.

In one embodiment, the buffer management system 114 monitors use of the ring buffer 112a and adjusts the size of the buffer to optimize use of the cache memory 108. A trigger event may invoke the buffer management system 114 to reevaluate the size of the ring buffer 112a. The trigger event may be, for example, passage of an amount of time, a certain number of traversals around the ring buffer, and/or the like. In response to the trigger event, the buffer management system 114 may apply one or more rules for shrinking, expanding, or leaving the buffer size intact. The rule may be, for example, that if the buffer consistently uses only a portion of its total size to hold data before the data is consumed, the size of the buffer may be shrunk based on the amount of the buffer that is unused. This may allow more, for example, a more efficient use of the cache memory 110 by allowing, for example, other CPU cores to use the unused portions.

In one embodiment, the ring buffer 112a is designed for a producer-consumer model where the storage device 102 is the producer, and the host 100 is the consumer. In this regard, the ring buffer 112a may include a head pointer that indicates the location in the buffer of the oldest data item that is to be consumed next, and a tail pointer of a next available location in the buffer to be written into. The host may 100 update the head pointer as it consumes data from the buffer, and the storage device 102 may update the tail pointer as it produces and writes data into the buffer.

In one embodiment, the ring buffer 112a adheres to a cache coherency protocol that allows coherent sharing of the buffer by the host 100 and the storage device 102. An example cache coherency protocol is a Compute Express Link (CXL).cache protocol. When the ring buffer 112a adheres to a cache coherency protocol, a single copy of the ring buffer 112a is maintained in a shared memory space. As updates are made to the ring buffer 112a by either the host 100 or the storage device 102, the updates are substantially immediately available to both parties.

In one embodiment, the ring buffer 112a adheres to a non-cache-coherency protocol. When the ring buffer 112a is not cache coherent, the storage device 102 may have no access to the ring buffer 112a in the host 100. According to this embodiment, the storage device 102 maintains a separate copy of the ring buffer 112a referred to as a shadow ring buffer 112b in an internal memory of the storage device. In one embodiment, the storage device 102 updates the tail pointer of the shadow ring buffer 112b as data is produced, and transmits metadata and the produced data to the host 100. The metadata may include, for example, the new position of the tail pointer. The tail pointer of the ring buffer 112a is eventually updated based on the received metadata. Similarly, the host 100 updates the head pointer of the ring buffer 112a as data is consumed, and transmits metadata to the storage device 102 to update the shadow ring buffer 112b. The metadata may include, for example, the new position of the head pointer. The head pointer of the shadow ring buffer 112b is eventually updated based on the received metadata.

In one embodiment, an eventual consistency model is employed for synchronizing the ring buffer 112a and shadow ring buffer 112b. Use of eventual consistency may help avoid express locking mechanisms to update the buffers. With eventual consistency, updates from a transmitting party to a receiving party (e.g. from the host 100 to the storage device 102) may not be immediately available given that there may be a delay as updates are received and processed. In this regard, the storage device 102 may think that the shadow ring buffer 112b is more full than it actually is because the head value of the shadow ring buffer 112b is not immediately updated when the host 100 consumes and updates the head pointer in the ring buffer 112a. The host 100 may think that there is less data in the ring buffer 112a than there actually is because the tail value of the ring buffer 112a is not immediately updated when the storage device 102 produces data and updates the tail pointer of the shadow ring buffer 112b. The updates, however, become eventually visible to the receiving party. Until then, prior pointer values are relied upon, helping avoid buffer overruns.

Figure 2:
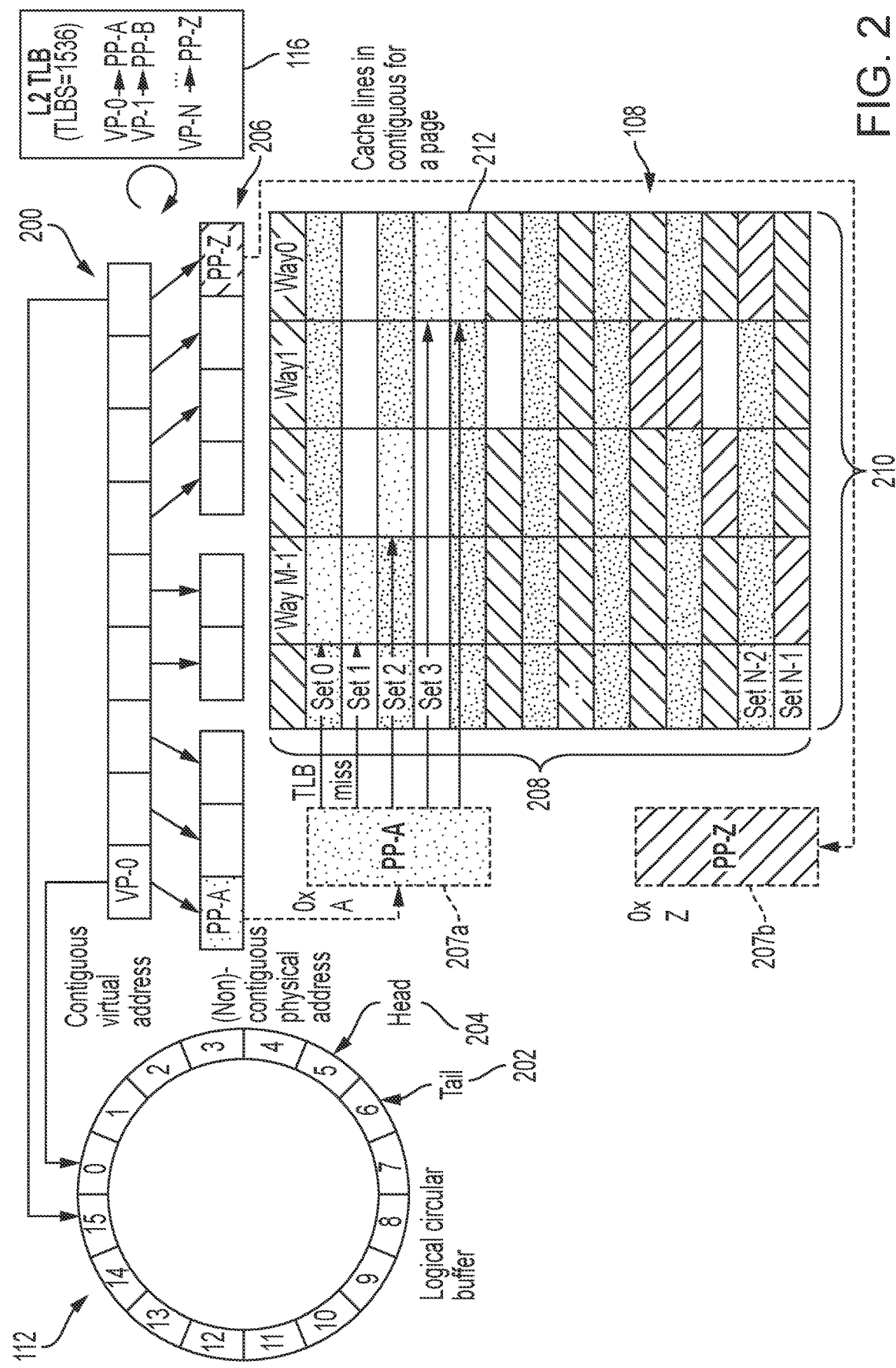
FIG. 2 shows a more detailed block diagram in comparison with FIG. 1 showing a ring buffer and a cache memory according to one embodiment.

FIG. 2 is a more detailed block diagram of the ring buffer 112a and the cache memory 108 according to one embodiment. In one embodiment, the ring buffer 112a includes a range of contiguous virtual memory addresses 200, a tail pointer 202, and a head pointer 204. As the storage device 102 writes data into the ring buffer 112a, the tail pointer 202 is incremented to indicate the production of the entry. As the host 100 reads the data from the ring buffer 112a, the head pointer 204 is incremented to indicate the consumption of the entry. By evaluating the distance between the head pointer 204 and the tail pointer 202, the storage device 102 and the host 100 can determine fullness of the buffer.

In one embodiment, the virtual memory addresses 200 are mapped to physical addresses 206 of the cache memory 108. The virtual memory addresses 200 may be in a contiguous virtual address space, while the physical pages may or may not be in a contiguous physical address space. For example, the physical addresses may be contiguous for addresses of a page 207a, 207b in the virtual address space.

In one embodiment, the cache memory 108 is configured as a set-associative cache, where the cache is divided into N sets 208a, and each set can fit M blocks of data (referred to as a cache line) 210a. For example, a 16-way associative cache can fit 16 cache lines 210a per set 208a. The blocks of a page in the virtual address space are stored in contiguous sets 208a in one of the various cache lines. For example, in a 16-way associative cache, if a cache line is 64 bytes, and a page in the virtual address space is 4 KB, the page addresses 64 64-byte blocks of data that may be stored in 64 contiguous sets, with the blocks being stored in one of the 16 cache lines of the set.

In one embodiment, the physical address that is mapped to a virtual address includes a set value and a tag value. The set value identifies one of the sets 208a of the cache memory associated with the physical address, and the tag value identifies one of the cache lines within the set (e.g. cache line 212).

In one embodiment, the ring buffer 112a is assigned a default buffer size with a default number of slots corresponding to the virtual addresses 200. The default buffer size may be selected, for example, by a system administrator. Once the ring buffer 112a is created with the buffer size, the buffer management system 114 may monitor (e.g. periodically) the maximum number of items in the buffer, and adjust the buffer size if the maximum number of items is less than the allocated buffer size. In one embodiment, a minimum unit of adjustment is the cache line size (e.g. 64 bytes).

In one embodiment, the size of the ring buffer 112a is calculated as follows:

$$\text{Floor(cache size/set size/cache line size/number of buffers)}*\text{cache line size}$$

For example, assuming a 1 MB, 16 set associative cache (e.g. cache size is 1 MB, and the set size is 16), where the cache line size is 64 B and four ring buffers are contemplated, a possible size of one of the ring buffers may be: (1024*1024/16/64/4)*64=16 KB (256 slots*64 B).

Figure 3:
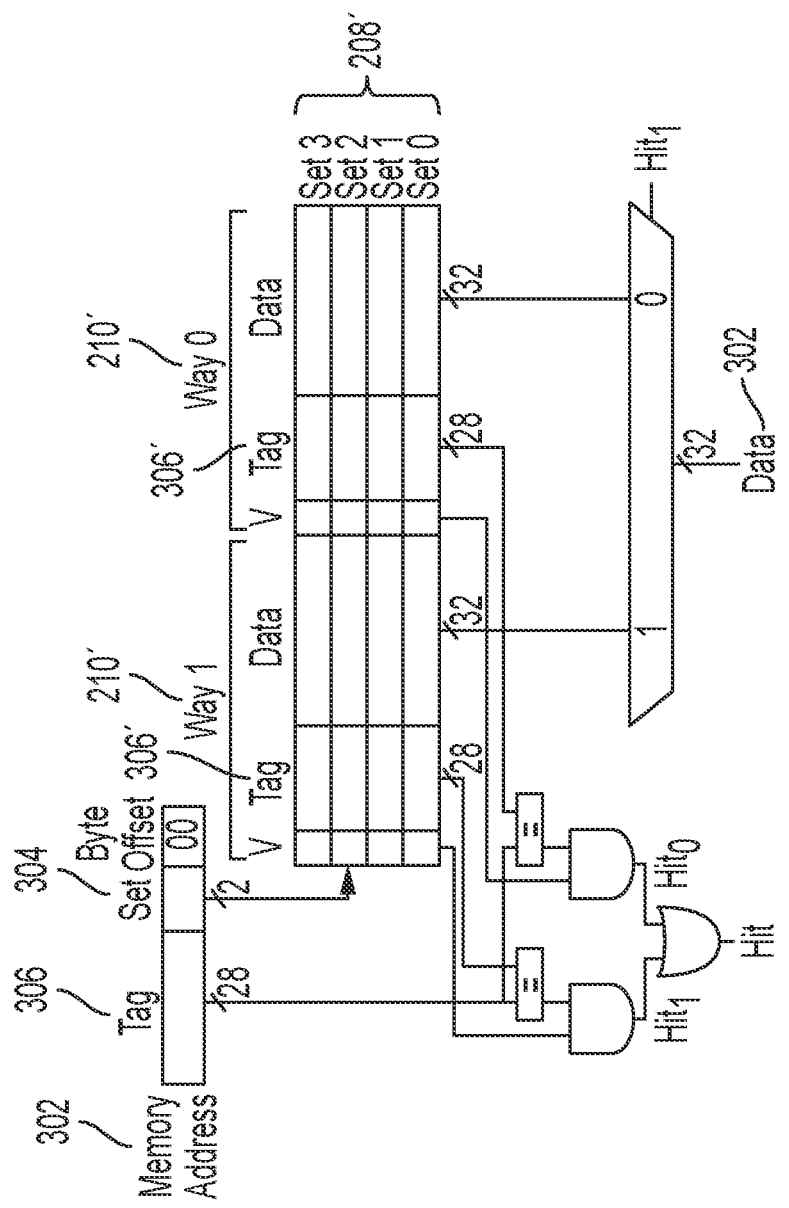
FIG. 3 shows a logic diagram for addressing a cache memory according to one embodiment.

FIG. 3 is a logic diagram for addressing the cache memory 108 according to one embodiment. Data 300 is stored to and retrieved from locations of the cache memory 108 using a physical memory address 302. In one embodiment, the physical memory address 302 is determined based on the virtual address of a slot of the ring buffer 112a that is mapped to the physical memory address 302. The physical memory address 302 includes "set" bits 304 that identify one of the sets 208b of the cache memory 108, and "tag" bits 306a that identify one of the cache lines 210b in the identified set. In one embodiment, the tag bits 306a are stored in the cache line 210b as stored tag bits 306b, along with the data 302.

When an application makes a request for a particular memory location, the set bits 304 of the requested memory location are used to identify the set 208b in the cache 108. The tag bits 306a of the requested memory location may then be compared against the stored tag bits 306b in the identified set, for determining whether the requested memory location is in the cache. If so, the data 302 stored in the identified cache line may be retrieved.

Figure 4:
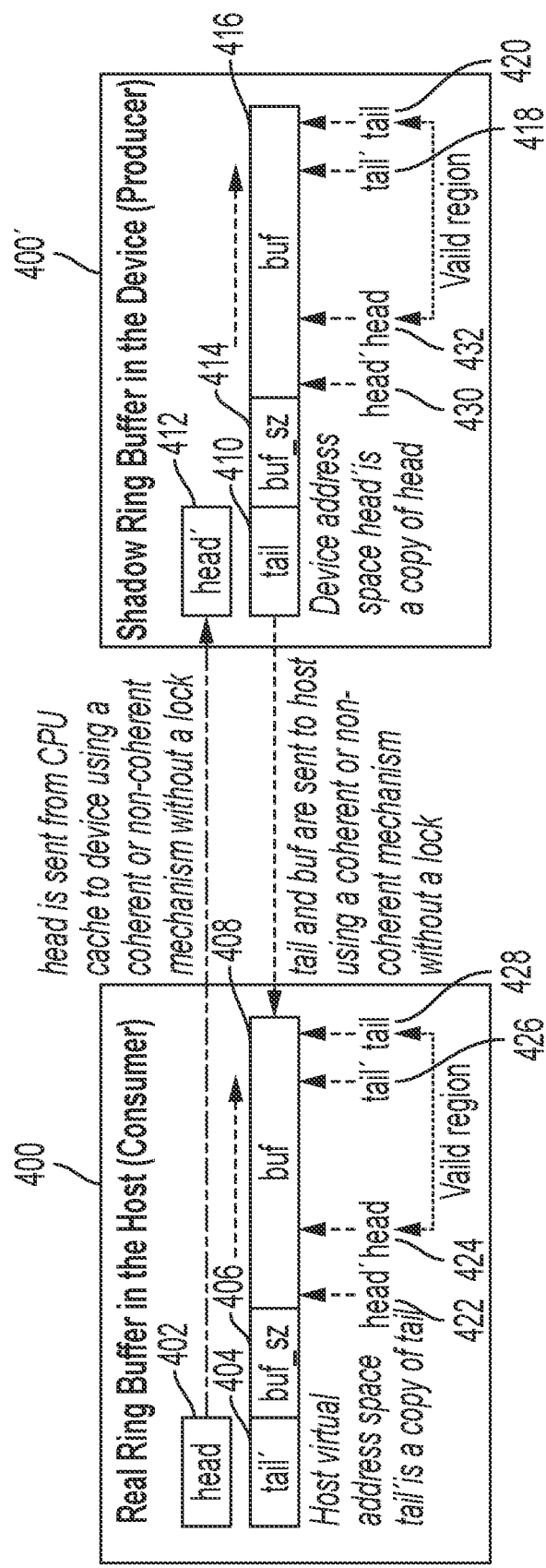
FIG. 4 shows a layout diagram of a ring buffer and a shadow ring buffer that are managed using eventual consistency according to one embodiment.

FIG. 4 is layout diagram of a ring buffer 400a (similar to ring buffer 112a) and a shadow ring buffer 400b (similar to shadow ring buffer 112b) that are managed using eventual consistency according to one embodiment. The host 100 creates the ring buffer 400a in a virtual address space with a head pointer 402, tail pointer copy 404, buffer size 406, and buffer entries 408. The storage device 102 creates the shadow ring buffer 400b based on the ring buffer 400a. The shadow ring buffer 400b includes a tail pointer 410, head pointer copy 412, buffer size 414, and buffer entries 416.

The host 100 consumes the buffer entries 408 and updates the head pointer 402 from a first head pointer location 422 to a second head pointer location 424. In one embodiment, the buffer management system 114 transmits metadata of the updated head pointer 402 to the storage device 102 for updating the head pointer copy 412. The updated head pointer 402 may be sent to the storage device using a coherent or non-coherent mechanism.

The storage device 102 produces buffer entries 416 and updates the tail pointer 410 from a first tail pointer location 418 to a second tail pointer location 420. In one embodiment, the buffer management system 114 transmits the produced data to the host 100 along with metadata of the updated tail pointer 410 using a coherent or non-coherent mechanism. In one embodiment, there is a gap from the time the tail pointer 410 is updated to when the tail pointer copy 404 is updated. Until the host 100 updates the tail pointer copy 404, the host relies a previous tail location 426 instead of the updated tail location 428. Thus, the host 100 may think that the ring buffer 400a has fewer entries than it actually has. In one embodiment, if the head pointer 402 equals the tail pointer copy 404, the host 100 determines that the ring buffer 400a is empty.

In regards to updating the head pointer, there is a gap from the time the head pointer 402 is updated to when the head pointer copy 412 is updated. Until the storage device 102 updates the head pointer copy 412, the storage device relies on a previous head location 430 instead of an updated head location 432. Thus, the storage device may think that the shadow ring buffer 400b is fuller than it actually is. In one embodiment, in order to distinguish between empty and full situations, if a next value of the tail pointer 410 equals the head pointer copy 412, the storage device 102 determines that the shadow ring buffer 400b is full.

Figure 5:
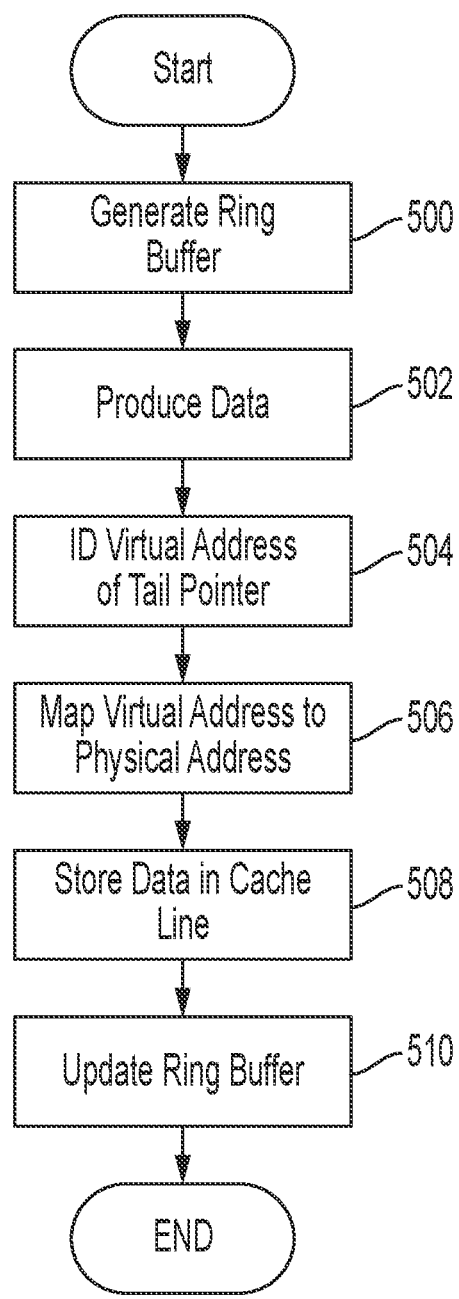
FIG. 5 shows a flow diagram of a process for managing utilization of a cache memory according to one embodiment.

FIG. 5 is a flow diagram of a process for managing utilization of the cache memory 108 according to one embodiment. The process starts, and in act 500, the ring buffer 112a (e.g. a first data structure) is generated, for example, by the buffer management system 114. The ring buffer 112a may be generated using a preset default size.

In act 502, data is produced, for example, by the storage device 102. For example, the data may be results of computations performed by the storage device for use by the CPU core 106 for further processing.

In one embodiment, the storage device 102 identifies a first virtual address associated with an available slot in the ring buffer 112a for storing the data. The data may be stored in chunks/blocks that correspond to the size of a cache line (e.g. 64B). In this regard, the storage device 102 identifies, in act 504, from the ring buffer 112a (in the event of a coherent cache memory 108) or shadow ring buffer 112b (in the event of a non-coherent cache memory 108), a value of the tail pointer 202 that identifies a next available slot in the buffer where the data is to be written into. The ring buffer 112a may be deemed full with no available slots, if a next value of the tail pointer 202 (e.g. current tail pointer+1) equals the head pointer 204.

Assuming that the ring buffer 112a is not full, the host 100 invokes the TLB 116 to map the virtual address 200 identified by the tail pointer 202 to a physical address in act 506. The physical address includes a set value identifying one of the sets 208a in the cache 108, and a tag value identifying a cache line 210 within the identified set.

In act 508, the data is stored in the identified cache line 210 along with the tag value. For example, the storage device 102 may store the data in the cache line 210 using a direct cache access mechanism.

In act 510, the ring buffer is updated (e.g. by the storage device 102) by advancing a location of the tail pointer 202 to point to a next slot of the ring buffer. When a last slot of the ring buffer is reached, the tail pointer wraps around to a beginning slot.

Figure 6:
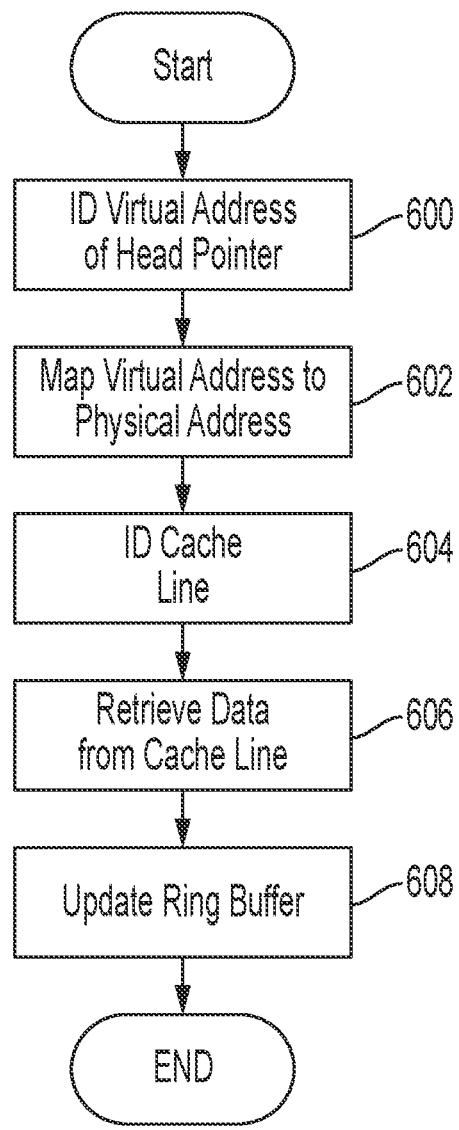
FIG. 6 shows a flow diagram of a process for consuming entries from a ring buffer according to one embodiment.

FIG. 6 is a flow diagram of a process for consuming entries from the ring buffer 112a according to one embodiment. The process starts, and in act 600, the CPU core 106 identifies a virtual address of a slot in the ring buffer 112a that is pointed by the head pointer 204.

In act 602, the virtual address is mapped to a physical address via the TLB 116. The physical address identifies the set 208a, and cache line 210 within the set, that is to be accessed.

In act 604, the requested cache line is identified based on a comparison of the tag bits 306a in the requested physical address, and the stored tag bits 306b in the various cache lines 210b within the set.

In act 606, the data stored in association with the matched tag bits is retrieved from the cache memory 108.

In act 608, the ring buffer 112a is updated by advancing a location of the head pointer 204 to point to a next slot of the ring buffer.

Figure 7:
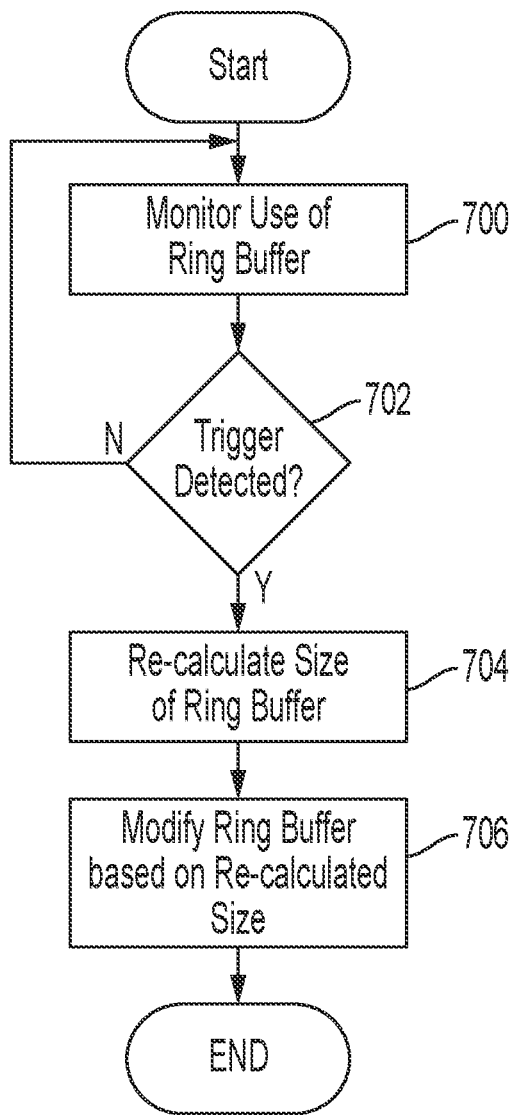
FIG. 7 shows a flow diagram of a process for dynamically adjusting a size of a ring buffer according to one embodiment.

FIG. 7 is a flow diagram of a process for dynamically adjusting a size of the ring buffer 112a according to one embodiment. In act 700, the use of the ring buffer 112a is monitored, for example, by the buffer management system 114. For example, the buffer management system 114 may periodically monitor the distance between the head pointer 204 and the tail pointer 202 for determining maximum fullness/utilization of the buffer at a given time.

In act 702, a determination is made as to whether a trigger condition is detected for recomputing the size of the ring buffer. The trigger condition may be, for example, passage of a certain amount of time, a certain number of traversals around the ringer buffer 112a, and/or the like.

If a trigger condition is detected, the buffer management system 114 re-calculates, in act 704, the size of the ring buffer 112a. For example, if maximum usage of the ring buffer at a given time is only 50% of the allotted size, the buffer management system 114 may shrink the size of the ring buffer 112a by half (e.g. reduce the number of slots of the ring buffer 112a, and associated virtual addresses, by half).

In act 706, the size of the ring buffer 112a is dynamically adjusted based on the recalculated size.

In some embodiments, the systems and methods for managing memory utilization discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

With respect to the processes described with respect to the flow diagrams of FIGS. 5-7, the sequence of steps of these processes are not fixed, but can be modified, changed in order, performed differently, performed sequentially, concurrently, or simultaneously, or altered into any desired sequence, as recognized by a person of skill in the art. The steps may be executed based on computer instructions stored in the non-transitory storage medium (e.g. random access memory) (also referred to as second memory).

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of systems and methods for managing memory utilization have been specifically described and illustrated herein, many modifications and variations will be apparent to those skilled in the art. Accordingly, it is to be understood that systems and methods for managing memory utilization constructed according to principles of this disclosure may be embodied other than as specifically described herein. The disclosure is also defined in the following claims, and equivalents thereof.

What is claimed is:

1. A method for managing memory, the method comprising:
generating a first data structure associated with one or more virtual addresses mapped to one or more physical addresses of the memory, wherein the first data structure is configured to implement a circular buffer, and wherein a size of the first data structure is based on a characteristic of the memory;
receiving, from a storage device coupled to a processor, data to be stored in the memory;
identifying a virtual address of the one or more virtual addresses based on the first data structure;
mapping the virtual address to a physical address;
storing the data in the physical address; and
updating identification of a first location of the first data structure based on the storing of the data, wherein the storage device provides the identification of the first location;
retrieving the data from the memory based on a request by the processor; and
updating identification of a second location of the first data structure based on the retrieving of the data, wherein the processor provides the identification of the second location.

2. The method of claim 1, wherein the memory includes a set associative cache memory.

3. The method of claim 1, wherein the first data structure is configured to track production and consumption of data in and out of the memory based on an eventual consistency model.

4. The method of claim 1, wherein the size of the first data structure is based on at least one of a size of the memory, a placement policy used by the memory, or a number of processors having access to the memory.

5. The method of claim 1, wherein the size is a cache line size.

6. The method of claim 1 further comprising:
generating, by a storage device, a second data structure, wherein the second data structure is based on the first data structure;
updating, by the storage device, the second data structure in response to producing the data; and
transmitting a message to a host computing device in response to the updating of the second data structure, for updating the first data structure, wherein the first data structure and the second data structure adhere to an eventual consistency model.

7. The method of claim 1 further comprising:
identifying a virtual address of the first data structure storing the data;
mapping the virtual address to the physical address of the memory;
retrieving the data from the physical address of the memory; and
updating the first data structure based on the retrieving of the data.

8. The method of claim 7 further comprising:
generating, by a storage device, a second data structure, wherein the second data structure is based on the first data structure;
receiving, by the storage device, a message from a host computing device in response to the updating of the first data structure; and updating, by the storage device, the second data structure in response to the message from the host computing device, wherein the first data structure and the second data structure adhere to an eventual consistency model.

9. A host computing device comprising:
   a memory; and
   a processor coupled to the memory, wherein the processor includes logic for:
      generating a first data structure associated with one or more virtual addresses mapped to one or more physical addresses of the memory, wherein the first data structure is configured to implement a circular buffer, and wherein a size of the first data structure is based on a characteristic of the memory;
      receiving, from a storage device coupled to the processor, data to be stored in the memory;
      identifying a first virtual address of the one or more virtual addresses based on the first data structure;
      mapping the first virtual address to a first physical address;
      storing the data in the first physical address, wherein identification of a first location of the first data structure is updated based on the storage device providing the data to be stored, wherein the storage device provides the identification of the first location;
      retrieving the data from the memory;
      based on the retrieving of the data:
         identifying a second location of the first data structure; and
         updating identification of the second location of the first data structure.

10. The host computing device of claim 9, wherein the memory includes a set associative cache memory.

11. The host computing device of claim 9, wherein the first data structure is configured to track production and consumption of data in and out of the memory based on an eventual consistency model.

12. The host computing device of claim 9, wherein the size of the first data structure is based on at least one of a size of the memory, a placement policy used by the memory, or a number of processors having access to the memory.

13. The host computing device of claim 9, wherein the size is a cache line size.

14. The host computing device of claim 9, wherein the processor includes logic for:
   identifying the first virtual address of the first data structure storing the data;
   mapping the first virtual address to the first physical address of the memory;
   retrieving the data from the first physical address of the memory; and
   updating the first data structure based on the retrieving of the data.

15. A storage device coupled to a host computing device having a memory, the storage device comprising:
   a non-transitory storage medium; and
   a processor coupled to the non-transitory storage medium, the processor having logic for:
      producing data;
      identifying a virtual address of one or more virtual addresses of a data structure, wherein the virtual address is mapped to a physical address of the memory of the host computing device, wherein the data structure is configured to implement a circular buffer, and wherein a size of the data structure is based on a characteristic of the memory;
      storing the data in the physical address;
      based on the storing of the data:
         identifying a first location of the data structure;
         updating identification of the first location of the data structure; and
         providing the identification of the first location to the host computing device,
   wherein, the host computing device is configured to retrieve the data from the memory, update identification of a second location of the data structure based on the host computing device retrieving the data, and provide the identification of the second location to the processor.

* * * * *